United States Patent
Wang

(10) Patent No.: US 6,686,057 B2
(45) Date of Patent: Feb. 3, 2004

(54) CHROMATE-FREE COATING FOR METAL HONEYCOMB

(75) Inventor: Yen-Seine Wang, Dublin, CA (US)

(73) Assignee: Hexcel Corporation, Dublin, CA (US)

( * ) Notice: Subject to any disclaimer, the term of this patent is extended or adjusted under 35 U.S.C. 154(b) by 32 days.

(21) Appl. No.: 10/062,827

(22) Filed: Jan. 31, 2002

(65) Prior Publication Data

US 2003/0143418 A1 Jul. 31, 2003

(51) Int. Cl.[7] .......................... B32B 15/04; B32B 15/02; B32B 15/20; B32B 3/28
(52) U.S. Cl. .................. 428/593; 428/640; 428/650; 428/654; 428/416; 428/418; 428/450
(58) Field of Search ................. 428/593, 639, 428/640, 650, 654, 457, 418, 416, 450, 447, 524

(56) References Cited

U.S. PATENT DOCUMENTS

| | | | |
|---|---|---|---|
| 3,551,183 A | * 12/1970 | Vondracek et al. | 117/49 |
| 3,687,882 A | 8/1972 | Bishop | 206/29.2 |
| 4,363,199 A | * 12/1982 | Kucheria et al. | 52/221 |
| 4,476,260 A | * 10/1984 | Salensky | 523/402 |
| 4,623,591 A | * 11/1986 | Pike | 428/414 |
| 4,799,349 A | * 1/1989 | Luckanuck | 52/809 |
| 5,112,418 A | * 5/1992 | Pike | 156/319 |
| 6,391,465 B1 | * 5/2002 | Zheng et al. | 428/450 |
| 6,440,552 B1 | * 8/2002 | Kajihara et al. | 428/323 |
| 6,531,013 B2 | * 3/2003 | Nitowski | 156/151 |

* cited by examiner

Primary Examiner—Michael La Villa
(74) Attorney, Agent, or Firm—Shapiro & Dupont LLP

(57) ABSTRACT

A coating for metal sheets used in fabricating honeycomb structures. The coating includes a first layer located on the surface of the metal sheet. The first layer includes hydrated alumina dispersed in a binder. The coating may further include a second layer located on top of the first layer. The second layer includes a polymer sealant. The first and second layer form a coating which is corrosion resistant and bonds well to the node adhesives used in forming honeycomb structures.

9 Claims, 2 Drawing Sheets

CHROMATE-FREE COATING FOR METAL HONEYCOMB

BACKGROUND OF THE INVENTION

1. Field of the Invention

The present invention relates generally to the sheets of metal, such as aluminum, which are used in the construction of honeycomb structures. More particularly, the invention involves the protective coatings or treatments that are applied to the metal sheets prior to formation of the sheets into a honeycomb.

2. Description of Related Art

Honeycomb structures are well known and widely used in many applications where a high strength and lightweight material is required. The combined features of lightweight and strength found in honeycomb structures makes them particularly well suited for use in aircraft and other applications where high strength and low weight are required. Honeycomb structures have been made from a wide variety of materials including metals, such as aluminum and aluminum alloys. Composite materials made from resin impregnated fibers and papers have also been widely used in honeycomb structures.

One common process for fabricating honeycomb structures involves bonding multiple thin sheets of aluminum together along specially oriented node lines. The node lines are offset between different layers in such a way that a honeycomb structure is formed when the layers are expanded. This type of process is commonly referred to as the "expansion" process. The expansion process is not suitable for fabricating honeycomb structures in some instances where certain types of aluminum or aluminum alloys are used. For example, sheets which are relatively thick or are made from certain alloys of aluminum are too stiff and cannot be formed into honeycomb structures using the expansion process.

A fabrication process or method commonly referred to as the "corrugation" process has been used to form high strength honeycomb structures in those situations where the expansion process is not suitable. The corrugation process involves initially shaping sheets of aluminum into a corrugated configuration. The corrugated aluminum sheets are then bonded together along node lines to form the final honeycomb.

In both the expansion and corrugation processes, adhesives are typically used to bond the aluminum sheets together. Such adhesives are commonly referred to as "node adhesives". The surfaces of the aluminum sheets are usually coated with a coating or otherwise treated to insure good adhesion between the node adhesive and the aluminum sheet. The strength of the bond between the adhesive and the treated aluminum sheets is generally determined by measuring the peel strength of the adhesive. Peel strength is typically measured using a standard procedure as set forth in ASTM D 1781. The test basically involves gluing two 3-inch (7.6 cm) or two 1-inch (2.54 cm) wide strips of metal sheets together and the measuring of the amount of force required to peel the two strips apart.

Achieving maximum peel strength for a given adhesive is an important goal when manufacturing high strength honeycomb. Failure of the adhesive bond between aluminum sheets can result in complete failure of the entire structure. Accordingly, there is a need to provide surface coatings and/or treatments for aluminum that enhance adhesion of the node adhesive to the surface.

Aluminum is also usually treated to increase resistance to corrosion. Chromate has been a popular corrosion resistant coating for aluminum that has been widely used. However, there are a number of environmental concerns associated with the use of chromate. A number of other corrosion resistant coatings have been developed for aluminum. For example, U.S. Pat. No. 3,687,882 describes coating aluminum with silane-titanante dispersions.

In the art of preparing aluminum honeycomb, there has been and continues to be a need for surface treatments that not only provide good peel strength, but also provide good corrosion protection. Developing a coating system or treatment that provides both of these two desirable features is important in making honeycomb from aluminum which is suitable for use where high strength and light weight is required.

SUMMARY OF THE INVENTION

In accordance with the present invention, it was discovered that metals, such as aluminum, can be coated with a two layer system that provides an unexpected combination of good adhesive bonding and corrosion resistance. The two-layer coating includes a first layer located on the surface of the metal which is composed of hydrated alumina and a binder. The second layer of the coating system is located on top of the first layer and includes a polymer sealant. This two-layer coating was found to be especially well suited for use in preparing honeycomb by either the expansion or corrugation process. The present invention not only covers individual sheets of metal having the above-described two-layer coating, but also covers honeycomb structures which are made from numerous sheets which are adhesively bonded together at spaced locations.

The present invention is also directed to methods for making coated metal structures that exhibit increased adhesion with node adhesives and increased corrosion resistance. The method involves applying a coating to the surface of the metal or metal alloy wherein the coating includes a first layer having hydrated alumina dispersed in a binder followed by a second layer located on top of the first layer which is composed of a polymer sealant.

As a feature of the present invention, it was discovered that metals which have the above-described two-layer coating can be used to form adhesively bonded structures that exhibit both high peel strength and corrosion resistance. The peel strength and corrosion resistance of structures having the combined two layer coating was found to be much higher than expected based on the peel strengths and corrosion resistance of structures having only one of the layers.

The above described and many other features and attendant advantages of the present invention will become better understood by reference to the following detailed description when taken in conjunction with the accompanying drawings.

DETAILED DESCRIPTION OF THE INVENTION

The coating of the present invention is designed for application on aluminum surfaces to provide good adhesion with node adhesives and corrosion resistance. As used in this Detailed Description and in the appended claims, the term "aluminum" means all types of aluminum metal which are typically used in honeycomb structures including aluminum alloys. Exemplary types of aluminum which are used in making honeycomb include 5052, 5056 and 2024. Although the coating is especially well suited for application to aluminum, the coating may also be applied to other metals which may be bonded together and that also require corrosion resistance. The following detailed description will be limited to describing coating of aluminum with it being understood that this is the preferred embodiment of the invention and that the coating may be used on other metals, if desired.

Figure 1:
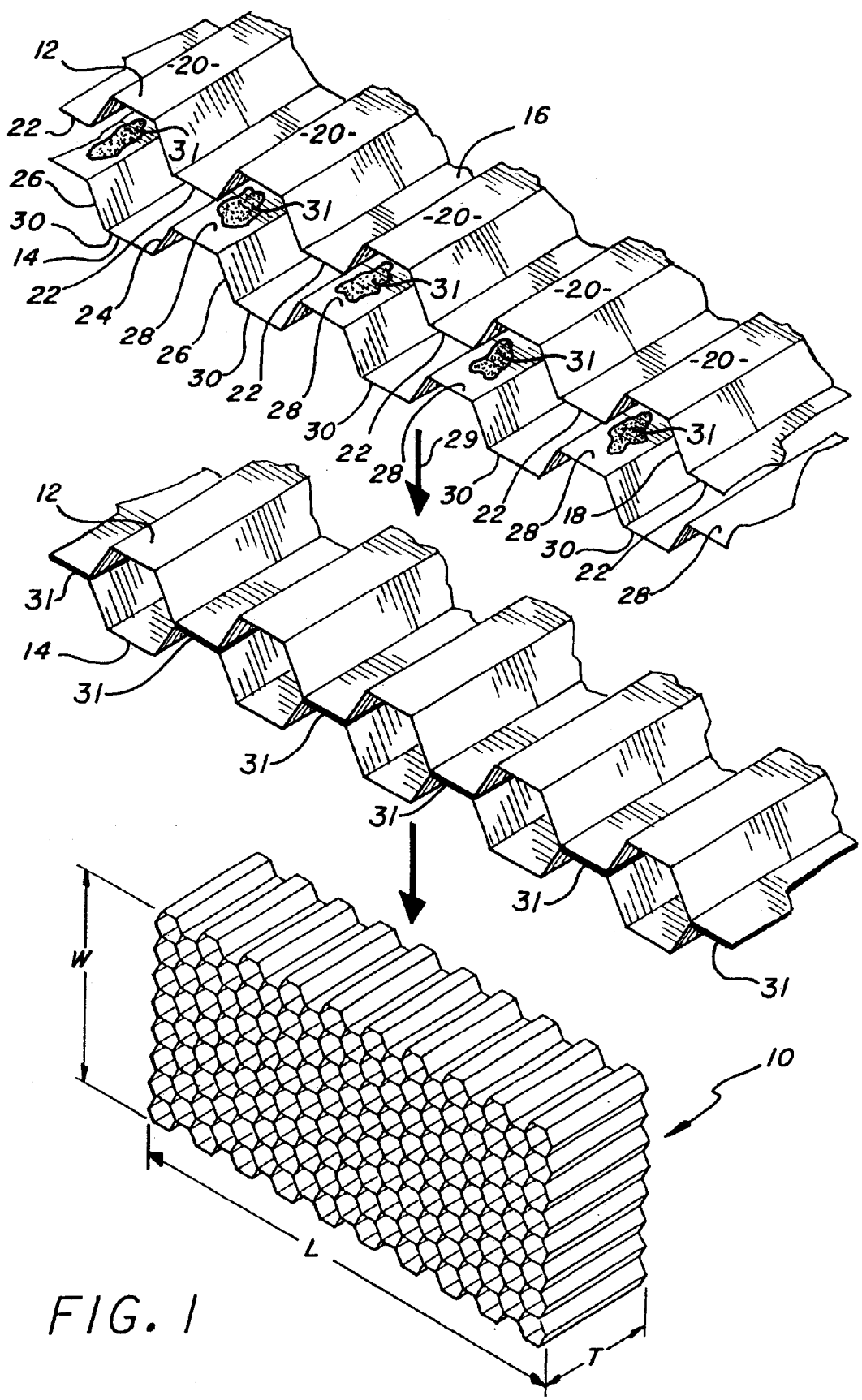
FIG. 1 is a simplified schematic representation of a honeycomb formation process utilizing sheets of aluminum which are coated in accordance with the present invention.

A simplified process showing construction of a honeycomb core from coated corrugated aluminum sheets in accordance with the present invention is diagrammatically shown in FIG. 1. The process is shown utilizing only two corrugated sheets 12 and 14 with it being understood that the same process is carried out numerous times with additional corrugated sheets to obtain multi-layered honeycomb of the type shown at 10.

The corrugated sheet 12 has a top surface 16 and bottom surface 18. The bottom surface 18 includes bottom node surfaces 22. The top surface 16 includes top surface includes top node surfaces 20. Likewise, the lower corrugated sheet 14 includes a top surface 24 and bottom surface 26. The top surface 24 includes top node surfaces 28 and the bottom surface 26 includes node surfaces 30. As represented in FIG. 1, by the top vertical arrow 29, the two corrugated sheets 12 and 14 are bonded together using a node adhesive 31.

The node adhesive 31 bonds the top node surfaces 28 of the lower layer 14 to the bottom node surfaces 22 of the upper layer 12 as shown in the middle of FIG. 1. This process is repeated numerous times for additional corrugated sheets. In each case, the upper node surfaces 28 of the lower layer are bonded to the bottom node surfaces 22 of the upper layer. As previously mentioned, for simplicity, FIG. 1 shows only the bonding of two layers together with it being understood that this process is repeated numerous times in order to achieve a honeycomb of the type shown at 10. The basic principles and procedures that are used in the corrugation honeycomb formation process are well known to those skilled in the art. The present invention also may be used to coat the thin aluminum sheets used in forming honeycomb by the expansion process. The present specification is limited to a description of forming honeycomb by the corrugation process. It will be understood that the same description is equally applicable in accordance with the present invention to formation of honeycomb using the expansion process. In addition, the coating of the present invention may be used on the face sheets or skins which are bonded to honeycomb to form structural panels.

Figure 2:
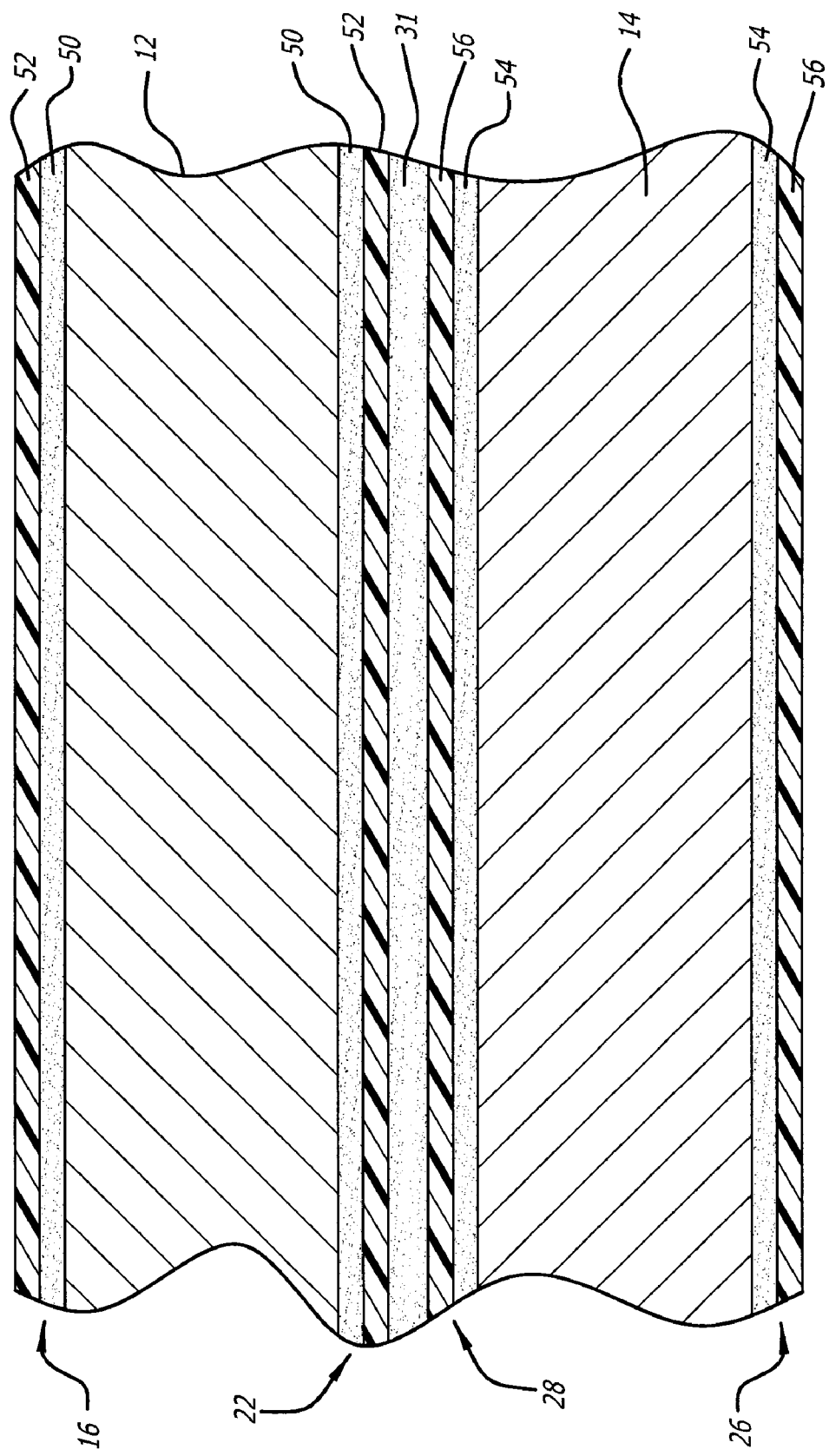
FIG. 2 is a detailed cross-sectional view showing an exemplary bond between two sheets of aluminum which are coated in accordance with the present invention.

FIG. 2 shows a detailed cross-sectional view of a portion of honeycomb 10 where the two aluminum sheets 12 and 14 are bound together utilizing node adhesive 31. The aluminum sheet 12 includes a coating on both sides in accordance with the present invention. The coating includes a first layer 50 which is located on the surface of the aluminum sheet. The first layer 50 includes hydrated alumina dispersed in a binder. Suitable binders include water-based phenolic resins, water-based epoxy resins, and silicone-based polymers of the type disclosed in U.S. Pat. No. 3,687,882. Exemplary binders are available commercially from Vantico, Inc. (Hawthorne, N.Y.) under the tradenames PZ3903 and ECN1400. Exemplary binders are also available from Durez, Inc. (Grand Island, N.Y.) under the tradename DUREZ 33304 and from Dow Corning (Farmington, Mich.) under the tradename Z-6040.

The hydrated alumina is preferably in the form of a fine powder that can be dispersed in an aqueous solution prior to mixing with the binder. Hydrated alumina powder is available commercially from a number of sources. The hydrated alumina powder is first dispersed in water and then mixed with the binder to form an alumina/binder dispersion that is applied to the aluminum surface. Application can be by any of the well known procedures including spraying, dipping, coating and brushing. The thickness of the resulting layer should be such that the weight of the uncured coating is between about 30–70 mg/sq. ft). It is preferred that the coating be cured in accordance with conventional procedures for the particular binder prior to application of the second layer. The amount of alumina hydrate in the cured first layer can range from 10 weight percent to 60 weight percent of the layer. The preferred amount of alumina hydrate is between about 15 weight percent to about 40 weight percent.

The coating includes a second layer 52 which functions as a seal coat. The second layer 52 is preferably a polymer sealant such as epoxy or phenolic resin. Other suitable polymer sealants include silane-based resins.

The polymer sealant layer 52 may also be applied using any of the known techniques for coating surfaces with resins. Such procedures include spraying, dipping, coating and brushing. The polymer sealant is cured according to conventional procedures for curing each particular resin. Phenolic resins are the preferred polymer sealant. Especially preferred are phenolic resins which are available commercially from Durez, Inc. (Grand Island, N.Y.) as phenolic primer 94–917.

The lower aluminum sheet 14 is bonded to aluminum sheet 12 by adhesive 31 as shown in FIG. 2. The lower sheet 14 is also coated on both sides utilizing a first layer 54 which includes the hydrated alumina dispersed in a binder along with second layer 56 which is composed of the polymer sealant. As shown in FIG. 2, it is preferred that both aluminum sheets 12 and 14 are coated on both sides. The sheets are preferably coated prior to bonding together with adhesive 31. Any suitable node adhesive may be utilized including phenolic and epoxy adhesives.

Examples of practice are as follows:

EXAMPLE 1

The following formulations set forth in Table 1 were prepared for use as the first layer of the coating.

TABLE 1

| Hydrated Alumina/Binder Dispersions | | | |
| --- | --- | --- | --- |
|  | A | B | C |
| Distilled Water | 60.17 | 51.32 | 49.21 |
| Z-6040 | 3.45 | 3.33 | 6.02 |
| Tyzor AA | 3.59 | 3.40 | 6.27 |
| Acetic Acid | 0.37 | 0.35 | 0.66 |
| Hydrated Alumina Dispersion | 32.42 | 31.21 | 28.37 |
| Isopropyl Alcohol |  | 10.40 | 9.46 |

All amounts in Table 1 are expressed as weight percentages. Z-6040 is γ-glycidoxypropyltrimethoxy silane which is available from Dow Corning (Farmington, Mich.). Tyzor AA is the acetoacetonate chelate of tetraisoproproxy titanate which is available from Dupont (Wilmington, Del.).

The hydrated alumina dispersion listed in Table 1 was made according to the following formulation:

| | |
|---|---|
| Hydrated Alumina: | 10.91 wt % |
| Acetic Acid | 0.92 wt % |
| Ammonium Hydroxide | 0.06 wt % |
| | (29% conc.) |
| Distilled water | 88.11 wt % |

1. Mix distilled water and acetic acid
2. Add Hydrated alumina and mix until all powder is in suspension
3. Add half of ammonium hydroxide and mix
4. Add the remainder slowly
5. Stop the addition of ammonium when the viscosity increases rapidly. The amount of ammonium listed above is an approximate value and can vary slightly.

The ingredients listed in Table 1 were mixed together to form mixtures of hydrated alumina dispersed in a binder which were applied to the surface of various sheets of aluminum foil. The mixtures were applied to form a 0.03 mil thick coating on the surface of each sheet of foil (approx. 50 mg/sq. ft). The aluminum sheets were made from 5056, 5052 and 2024. The layers of hydrated alumina+binder where then cured in an oven at 300° F. for approximately 30 seconds.

The formulations listed in Table 2 were prepared for use as the second layer of the coating.

TABLE 2

Seal Coating

| | a | b |
|---|---|---|
| A1120 | 0.97 wt % | — |
| Tyzor GBA | 0.78 wt % | — |
| Phenolic (94-917) | — | 25 wt % |
| Acetone | — | 75 wt % |
| Distilled Water | 98.25 wt % | — |

A1120 is a γ-glycidoxypropyltrimethoxy silane which is available from OSI Specialties, Inc., (Tarrytown, N.Y.). Tyzor GBA is similar to Tyzor AA and is also available from Dupont (Wilmington, Del.).

The two formulations a and b were prepared by mixing the ingredients together at room temperature. The formulations a and b were coated onto the cured first layer to form second outer layers which weighed about 5 mg/sq. ft. The second layer with formulation a was cured by heating in an oven at 300° F. for 30 seconds. The second layer with formulation b was cured in oven at 350° F. for 2 minutes.

A number of different combinations of first and second layers were applied to different sheets of aluminum foil. The resulting coated sheets were subjected to a salt spray corrosion test. The results of the salt spray tests are set forth in Table 3.

TABLE 3

| Coating | Loss of Weight Due To Corrosion (mg/sq. ft) |
|---|---|
| a alone | 28.5 |
| C alone | 27.2 |
| B + a | 16.8 |
| No coating | 42.9 |
| B + b | 4.0 |
| a + b | 8.5 |

As can be seen from the results set forth in Table 3, the use of a phenolic second layer (b) when combined with a first layer in accordance with the present invention provides an especially corrosion resistant coating. It is expected that coatings where the first layer includes a phenolic resin binder will be even more corrosion resistant.

EXAMPLE 2

The same formulations set forth in Tables 1 and 2 were used to coat sheets of 4.7 mil aluminum foil in the same manner as Example 1. The coated aluminum sheets were then bound together using a phenolic node adhesive. The adhesive was applied to provide an adhesive layer between the two sheets which was 3 mls thick.

The bonded aluminum sheets were then subjected to peel tests in accordance with ASTM 1781. The results are set forth in Table 4.

TABLE 4

| Coating | Peel Strength |
|---|---|
| a alone | 1.07 |
| No coating | 1.27 |
| A alone | 10.18 |
| A + a | 8.96 |
| B alone | 9.18 |
| B + a | 10.3 |
| B + b | 8.01 |
| a + b | 2.52 |

As can be seen from Table 4, the coating (B+b) which exhibited an especially high and unexpected corrosion resistance (see Table 3) also exhibited good peel strength. It is also expected that coatings composed of A+b and C+b will provide good corrosion resistance and peel strength.

The results shown in Tables 3 and 4 show that the single layer coating (A or B) provides high peel strength and some improvement in corrosion resistance. Those coatings which include two layers in accordance with the present invention exhibit high corrosion resistance and peel strength.

EXAMPLE 3

Additional examples of suitable hydrated alumina/binder dispersions are set forth in Table 5 below. Additional examples of suitable seal coatings are set forth in Table 6 below.

TABLE 5

Hydrated Alumina/Binder Dispersions

| | D | E | F | G |
|---|---|---|---|---|
| Durez 33304 | — | — | 6 | — |
| PZ 3903 | — | 9 | — | — |
| ECN 1400 | 11 | — | — | 20 |
| Lica 38J | 0.02 | 0.02 | — | 0.02 |
| Tyzor GBA | 0.03 | 0.03 | — | 0.03 |
| EMI-24 | 0.13 | 0.13 | — | 0.25 |
| Alumina Dispersion | 28.64 | 28.71 | 28.64 | 28.64 |
| Di water | 60.19 | 62.11 | 65.34 | 51 |
| BYK 381 | — | — | 0.02 | — |
| Total wt % | 100 | 100 | 100 | 100 |

TABLE 6

Seal Coatings

| | c | d | e |
|---|---|---|---|
| Durez 33304 | — | — | 3 |
| PZ 3903 | — | 4 | — |
| ECN 1400 | 5.5 | — | — |
| Lica 38J | 0.02 | 0.02 | — |
| Tyzor GBA | 0.03 | 0.03 | — |
| EMI-24 | 0.07 | 0.06 | — |
| Di water | 94.38 | 95.89 | 96.98 |
| BYK 381 | — | — | 0.02 |
| Total wt % | 100 | 100 | 100 |

The formulations set forth in Tables 5 and 6 may be used in the same manner as described in Examples 1 and 2. All possible combinations of first layers D–G may be made with second layers c–e to provide suitable final coatings in accordance with the present invention. If desired, formulation G may be used by itself to provide a single layer coating which exhibits corrosion resistance and good node adhesive bonding. Such single layers exhibit good corrosion resistance without the need for chromium oxide or other corrosion inhibitors.

DUREZ 33304 is a water-based phenolic that is available from Durez, Inc. (Grand Island, N.Y.). PZ 3903 and ECN 1400 are water-based epoxies that are available from Vantico (Hawthorne, N.Y.). LICA 38J is a coupling agent that is available from Ken-React, Inc. (Bayonne, N.J.). EMI-24 is 2-ethyl-4-methyl imidazole and BYK-381 is a surfactant that is available from BYK-Chemie USA (Wallingford, Conn.).

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A coated structure comprising:
   a. a body comprising a honeycomb structure, said honeycomb structure having a surface comprising a metal;
   b. a coating on said surface, said coating comprising: a first layer located on the surface of said body, said first layer comprising hydrated alumina dispersed in a binder.

2. A coated structure according to claim 1 which further includes a second layer located on top of said first layer, said second layer comprising a polymer sealant.

3. A coated structure according to claim 1 wherein said binder is selected from the group of polymers consisting of silane, epoxy and phenolic.

4. A coated structure according to claim 2 wherein said polymer sealant is selected from the group of polymers consisting of epoxy and phenolic.

5. A coated structure according to claim 2 wherein said binder is selected from the group of polymers consisting of silane, epoxy and phenolic.

6. A coated structure according to claim 1 wherein said honeycomb structure comprises:
   a plurality of corrugated metal sheets, said corrugated sheets each comprising a top surface and a bottom surface that comprise said metal and wherein said top surface includes a plurality of top node surfaces and said bottom surface includes a plurality of bottom node surfaces; and
   an adhesive for bonding said plurality of corrugated metal sheets together at said top and bottom nodes to provide a honeycomb comprising a stack of corrugated metal sheets wherein the top node surfaces of each corrugated metal sheet are bonded with said adhesive to the bottom node surfaces of the corrugated metal sheet located above the top node surfaces of each of said corrugated metal sheets.

7. A coated structure according to claim 6 wherein said corrugated metal sheets comprise aluminum or an aluminum alloy.

8. A coated structure according to claim 6 wherein said first layer is located on both said top and bottom surfaces of said corrugated metal sheets.

9. A coated structure according to claim 8 which further includes a second layer located on top of said first layer on both said top and bottom surfaces of said corrugated metal sheets said second layer comprising a polymer sealant.

* * * * *